(12) United States Patent
Mizokane et al.

(10) Patent No.: US 12,187,355 B2
(45) Date of Patent: Jan. 7, 2025

(54) LOWER VEHICLE-BODY STRUCTURE OF VEHICLE

(71) Applicant: Mazda Motor Corporation, Hiroshima (JP)

(72) Inventors: Michiya Mizokane, Aki-gun (JP); Yuki Ikawa, Aki-gun (JP); Tomomu Arai, Aki-gun (JP); Shota Sato, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 281 days.

(21) Appl. No.: 17/892,155

(22) Filed: Aug. 22, 2022

(65) Prior Publication Data

US 2023/0076914 A1 Mar. 9, 2023

(30) Foreign Application Priority Data

Sep. 3, 2021 (JP) .................................. 2021-143661

(51) Int. Cl.
*B62D 35/00* (2006.01)
(52) U.S. Cl.
CPC .................................. *B62D 35/007* (2013.01)
(58) Field of Classification Search
CPC ...... B62D 35/00; B62D 35/007; B62D 35/02; Y02T 10/82

USPC ...................................................... 296/180.1
See application file for complete search history.

(56) References Cited

U.S. PATENT DOCUMENTS 10,913,501 B2 * 2/2021 Kishima .............. B62D 35/005

FOREIGN PATENT DOCUMENTS

| FR | 2920398 A1 * | 3/2009 | ........... B62D 25/087 |
| JP | 6052229 B2 | 12/2016 | |
| KR | 20210001559 A * | 1/2021 | |

OTHER PUBLICATIONS

FR2920398 Text (Year: 2009).*
KR20210001559 Text (Year: 2021).*

* cited by examiner

*Primary Examiner* — Dennis H Pedder
(74) *Attorney, Agent, or Firm* — XSENSUS LLP

(57) ABSTRACT

A shield may be provided between a rear bumper and a silencer, the shield may be provided so as to extend in the vehicle width direction to overlap with at least a rear vertical wall of the silencer in the up-down direction in vehicle rear view, and the shield may be provided with a guider that guides underfloor traveling air downward, the underfloor traveling air flowing to the rear side through a lower portion of the silencer.

16 Claims, 11 Drawing Sheets

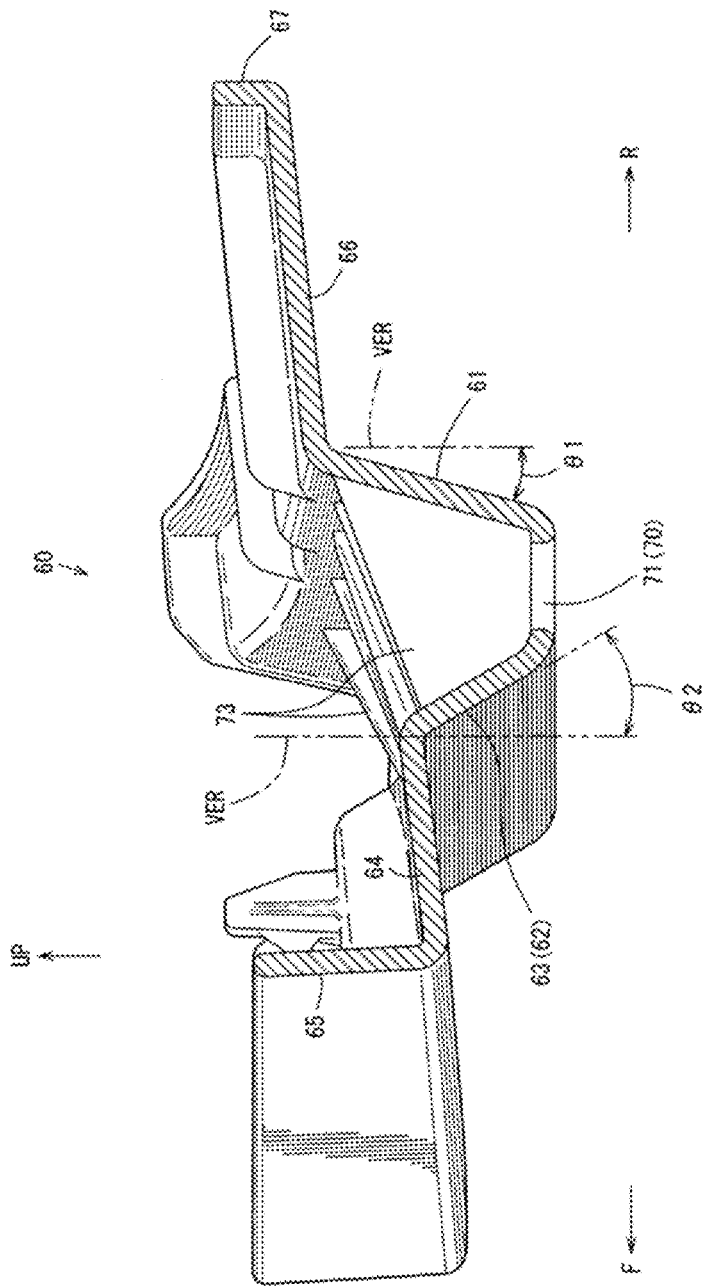

LOWER VEHICLE-BODY STRUCTURE OF VEHICLE

CROSS-REFERENCE TO RELATED APPLICATION

The present application claims priority to Japanese patent application JP 2021-143661, filed Sep. 3, 2021, the entire contents of which being incorporated herein by reference in its entirety.

TECHNICAL FIELD

The present disclosure relates to a lower vehicle-body structure of a vehicle including a silencer transversely disposed on the lower front side of a rear bumper so as to extend in the vehicle width direction.

BACKGROUND ART

Hitherto, the vehicle including the silencer transversely disposed on the lower front side of the rear bumper so as to extend in the vehicle width direction in the abovementioned example has been known.

In this case, if a lower end of the silencer is disposed in a position lower than a lower end of the rear bumper, the appearance of the vehicle is degraded at the time of the abovementioned silencer being visually observed when seen from the rear side, in particular, the appearance is degraded when a night light of a following vehicle hits and is reflected by the silencer.

The abovementioned rear bumper section also has had a problem in that underfloor traveling air that flows from the vehicle front side to the vehicle rear side through the vehicle-body lower side becomes entrained by a lower rear portion of the rear bumper described above, thereby causing the deterioration of a Cd value (coefficient of drag) in aerodynamic characteristics.

Incidentally, in Patent Literature 1, a lower vehicle-body structure of a vehicle configured so as to improve the aerodynamic performance by an undercover by providing the undercover between a rear bumper and a silencer is disclosed.

According to the lower vehicle-body structure of the vehicle of the related art disclosed in Patent Literature 1, the following can be said. While there is an advantage in that the aerodynamic characteristics can be improved, there has been a problem in that the appearance of the vehicle is degraded because the undercover is positioned on the upper side and the vehicle front side of a lower end of the rear bumper and the silencer is visually observed when seen from the vehicle rear side.

CITATION LIST

Patent Literature

[Patent Literature 1] Japanese Patent No. 6052229

SUMMARY

Problems to be Solved by the Disclosure

Therefore, an object of the present disclosure is to provide a lower vehicle-body structure of a vehicle capable of improving appearance by suppressing a case where a silencer is visible from the vehicle rear side and improving aerodynamic characteristics by suppressing entrainment of underfloor traveling air on the rear side of a rear bumper.

Means for Solving the Problem

One embodiment of the present disclosure is a lower vehicle-body structure of a vehicle, the lower vehicle-body structure including a silencer transversely disposed on a lower front side of a rear bumper so as to extend in a vehicle width direction, characterized in that: a shielding member or shield is provided between the rear bumper and the silencer; the shielding member is provided so as to extend in the vehicle width direction to overlap with at least a rear vertical wall of the silencer in an up-down direction in vehicle rear view; and the shielding member is provided with a guide portion that guides underfloor traveling air downward, the underfloor traveling air flowing to a rear side through a lower portion of the silencer.

By one embodiment of the present disclosure, the appearance can be improved by suppressing a case where the silencer is visible from the vehicle rear side and the aerodynamic characteristics can be improved by suppressing the entrainment of the underfloor traveling air on the rear side of the rear bumper.

In detail, the shielding member may overlap with at least the rear vertical wall of the silencer in the up-down direction in vehicle rear view. Therefore, the appearance can be improved by suppressing a case where the silencer is visible from the vehicle rear side.

On the shielding member, the guide portion that guides the underfloor traveling air, which flows to the vehicle rear side from the vehicle front side through the lower portion of the silencer, downward may be provided. Therefore, the aerodynamic characteristics can be improved by deflecting the underfloor traveling air to the lower side so as to suppress the entrainment of the underfloor traveling air on the rear side of the rear bumper.

As an aspect of the present disclosure, the guide portion may be provided a blow-out hole which guides traveling air downward and from which the traveling air is blown out, the traveling air flowing to the rear side through an upper portion of the silencer.

By the aspect of the present disclosure, the underfloor traveling air is pushed down to the lower side by the traveling air blown out downward from the abovementioned blow-out hole. Therefore, the entrainment of the underfloor traveling air on the rear side of the rear bumper can be suppressed even more, thereby further improving the aerodynamic characteristics.

As an aspect of the present disclosure, the shielding member may include: a shielding surface that overlaps with at least the rear vertical wall of the silencer in the up-down direction in vehicle rear view; and a guide surface that is positioned on a front side of the shielding surface and guides the underfloor traveling air downward, the underfloor traveling air flowing to the rear side through the lower portion of the silencer, and the guide surface and the shielding surface may be provided to be offset from each other in a vehicle front-rear direction.

By the aspect of the present disclosure, effects as follows are obtained.

Specifically, a shielding function required for the shielding surface and a guiding function required for the guide surface are fundamentally different from each other, but the functions in accordance with the respective requirements can be ensured by providing the guide surface and the shielding surface to be offset from each other in the vehicle front-rear direction.

As an aspect of the present disclosure, the shielding surface may be formed in an inclined form in which the shielding surface is positioned closer to a vehicle front side as the shielding surface approaches a lower side, and the guide surface may be formed in an inclined form in which the guide surface is positioned closer to a vehicle rear side as the guide surface approaches the lower side.

By the aspect of the present disclosure, the shielding surface and the guide surface in inclined forms in accordance with the respective requirements for the abovementioned shielding surface and the abovementioned guide surface can be formed.

As an aspect of the present disclosure, the abovementioned blow-out holes may be formed between the abovementioned shielding surface and the abovementioned guide surface.

By the aspect of the present disclosure, the aerodynamic characteristics can be improved by pushing the underfloor traveling air down to the lower side by the air blown out from the abovementioned blow-out holes formed between the abovementioned shielding surface and the abovementioned guide surface and suppressing the entrainment of the underfloor traveling air on the rear side of the rear bumper.

As an aspect of the present disclosure, the abovementioned blow-out hole may be formed in a slit shape long in the vehicle width direction in a vehicle-width-direction central portion of the abovementioned shielding member.

By the aspect of the present disclosure, a function of pushing the underfloor traveling air at the vehicle-width-direction central portion down to the lower side by the air blown out from the blow-out hole having a slit shape long in the vehicle width direction can be sufficiently ensured, and the entrainment of the underfloor traveling air on the rear side of the rear bumper can be suppressed in an even more reliable manner.

Advantageous Effects of Disclosure

According to the present disclosure, an effect in which the appearance is improvable by suppressing a case where the silencer is visible from the vehicle rear side and the aerodynamic characteristics are improvable by suppressing the entrainment of the underfloor traveling air on the rear side of the rear bumper is obtained.

BRIEF DESCRIPTION OF DRAWINGS

FIG. 11 is a cross-sectional view of a vehicle-width-direction central portion of the shielding member according to some embodiments of the present disclosure.

MODES FOR CARRYING OUT THE DISCLOSURE

An object of improving appearance by suppressing a case where a silencer is visible from the vehicle rear side and improving aerodynamic characteristics by suppressing the entrainment of underfloor traveling air on the rear side of a rear bumper is realized by a configuration of a lower vehicle-body structure of a vehicle, the lower vehicle-body structure including the silencer transversely disposed on a lower front side of the rear bumper so as to extend in a vehicle width direction. In the lower vehicle-body structure, a shielding member or shield is provided between the rear bumper and the silencer, the shielding member is provided so as to extend in the vehicle width direction to overlap with at least a rear vertical wall of the silencer in an up-down direction in vehicle rear view, and the shielding member is provided with a guide portion or guider that guides underfloor traveling air downward provided in the shielding member, the underfloor traveling air flowing to a rear side through a lower portion of the silencer.

Embodiment

One embodiment of the present disclosure is described in detail with reference to the drawings below.

Figure 1:
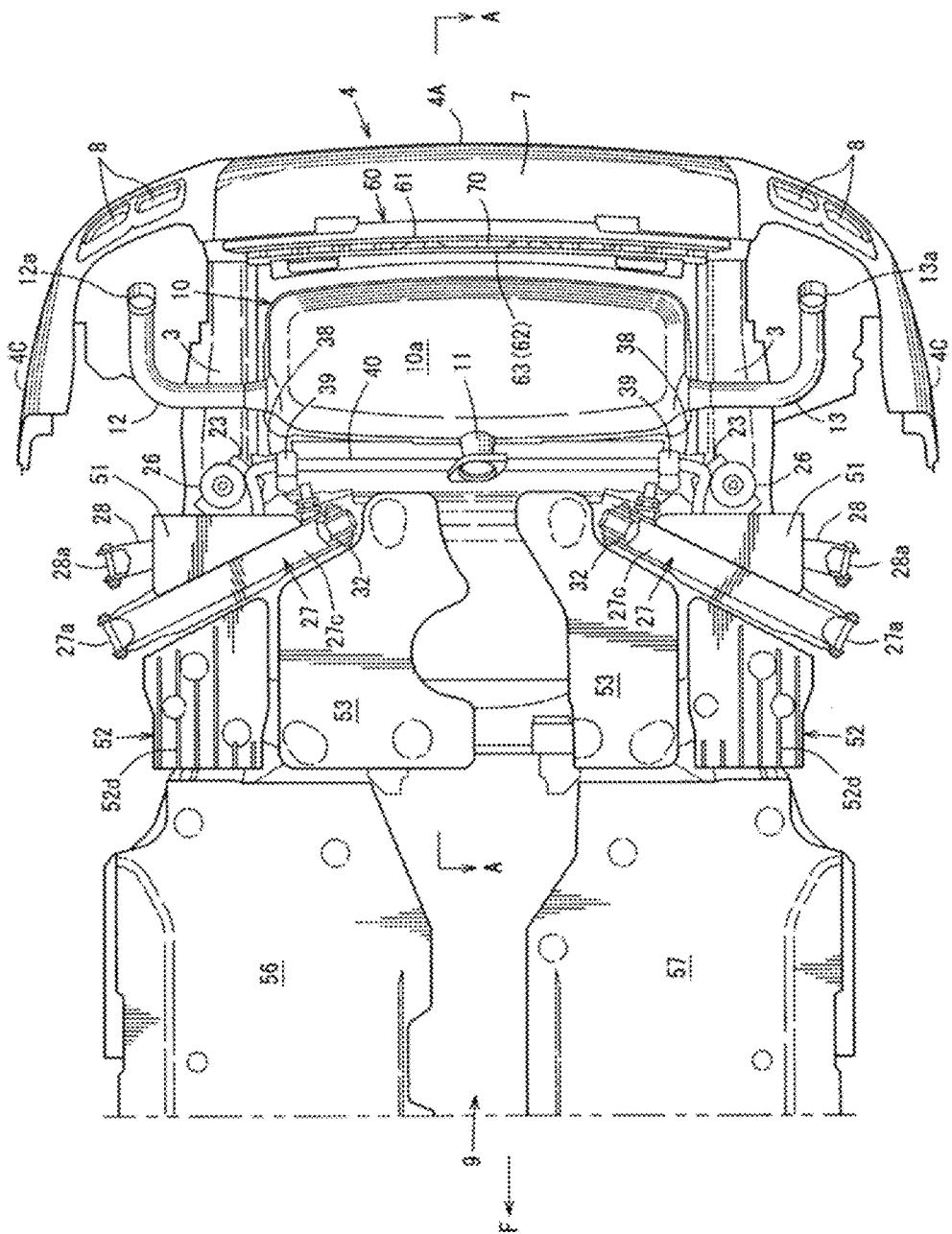
FIG. 1 is a bottom view of a lower vehicle-body structure of a vehicle according to some embodiments of the present disclosure.
Figure 2:
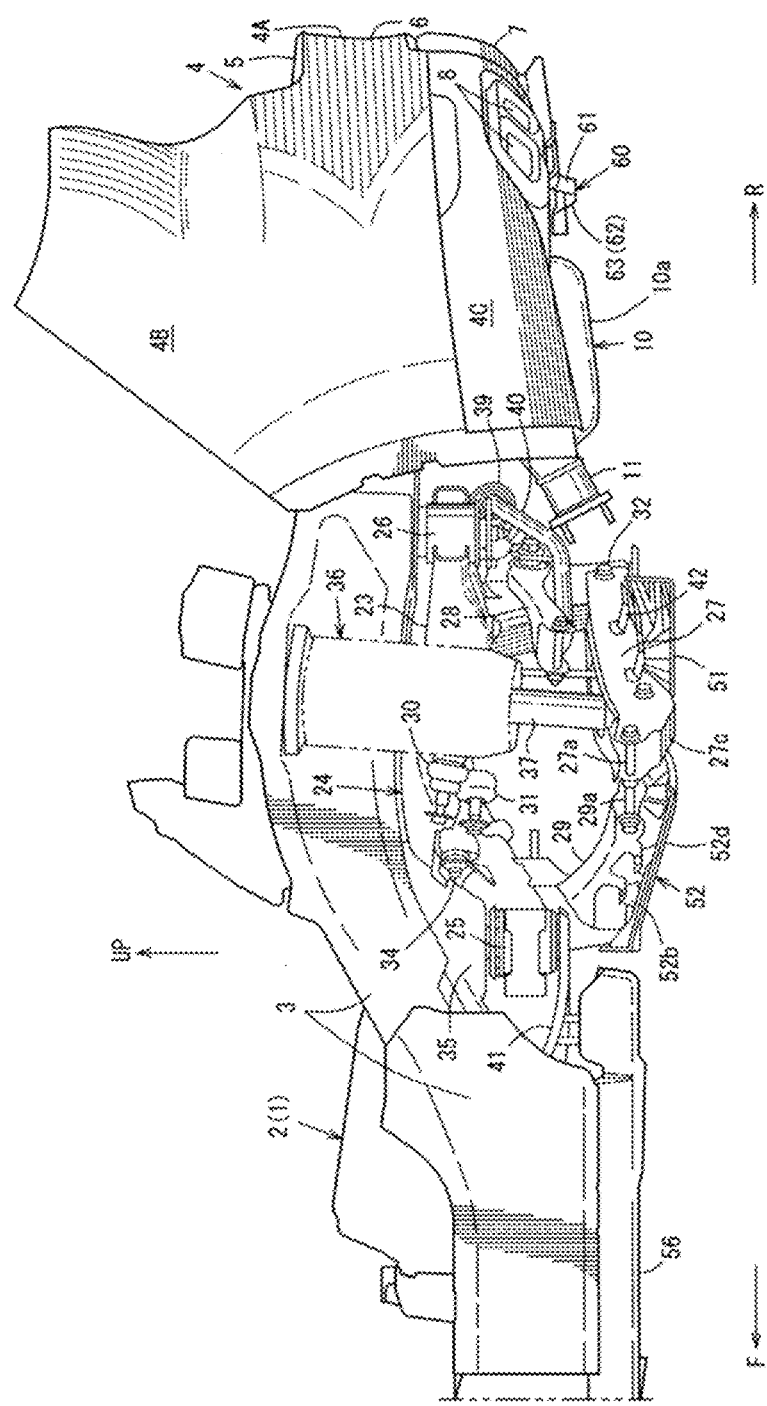
FIG. 2 is a side view of the vehicle left side illustrating the lower vehicle-body structure of the vehicle according to some embodiments of the present disclosure.
Figure 3:
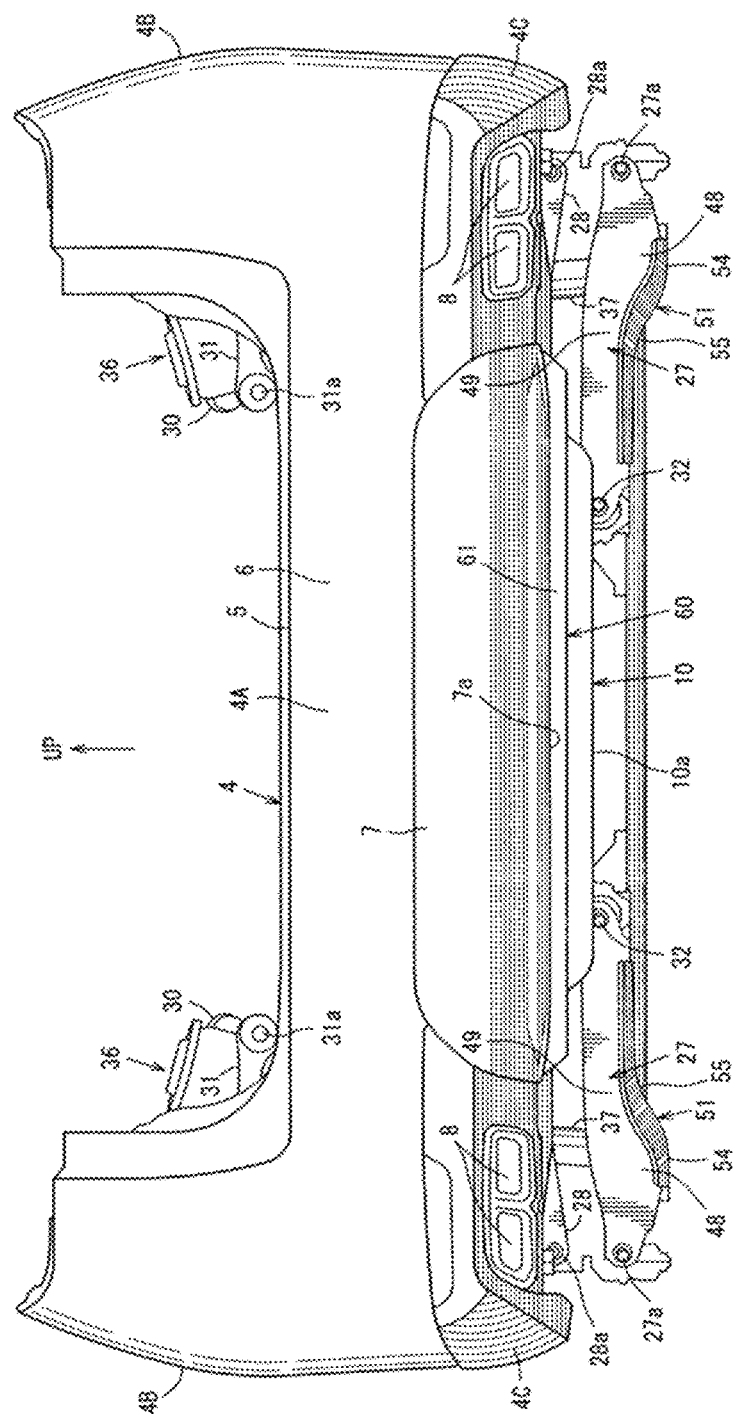
FIG. 3 is a rear view of the lower vehicle-body structure of the vehicle according to some embodiments of the present disclosure.
Figure 4:
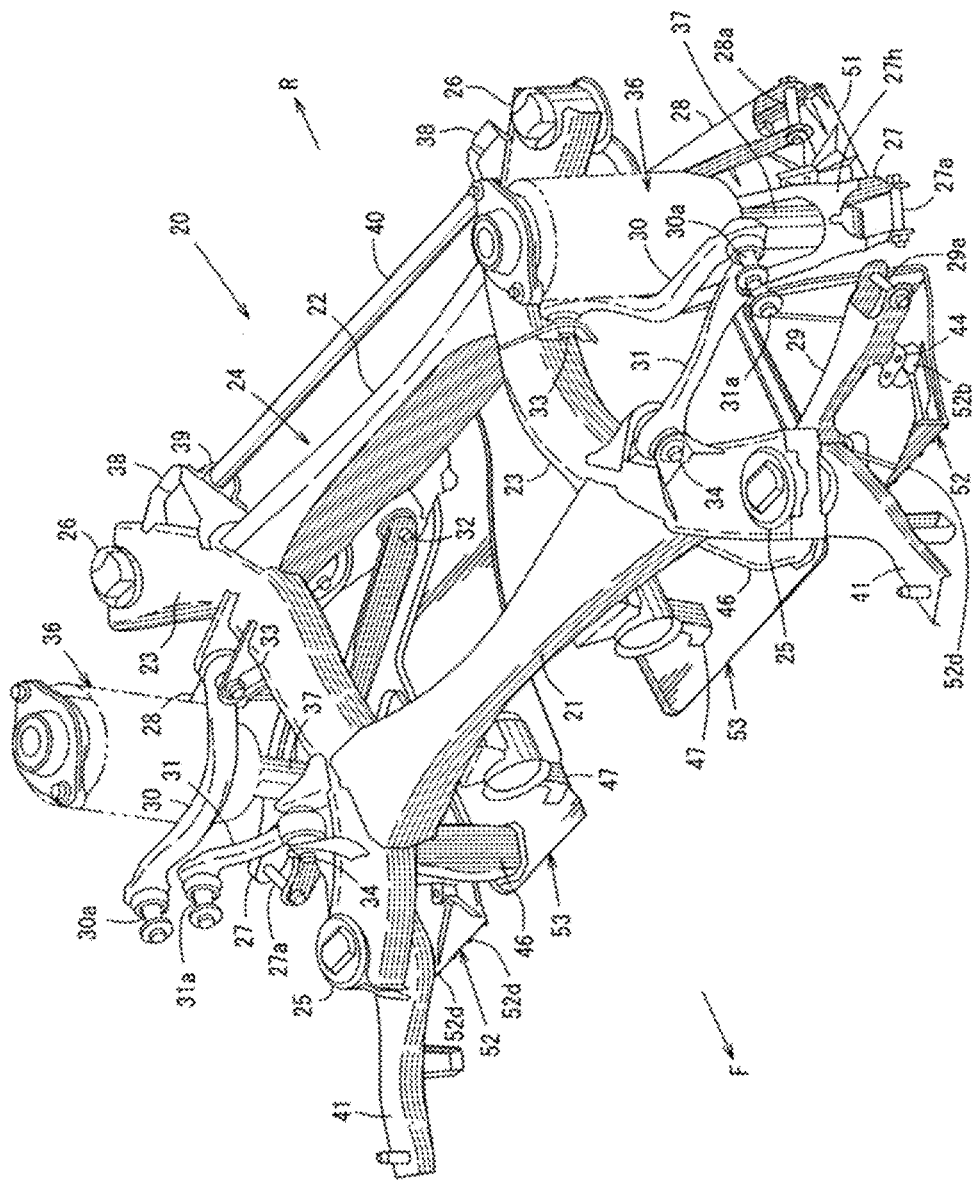
FIG. 4 is a perspective view illustrating a rear suspension apparatus according to some embodiments of the present disclosure.
Figure 5:
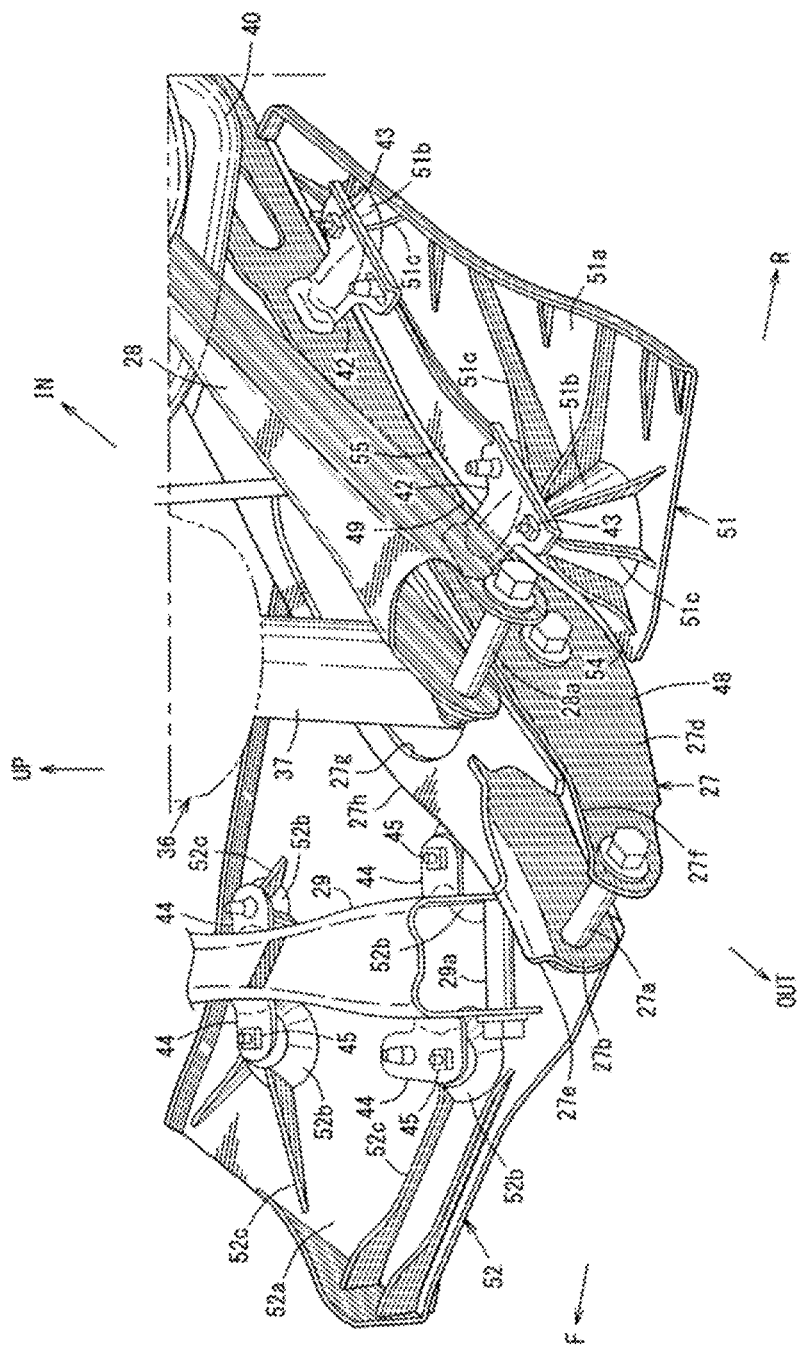
FIG. 5 is a main-part perspective view illustrating a mounting structure of each of first and second undercover members according to some embodiments of the present disclosure.
Figure 6:
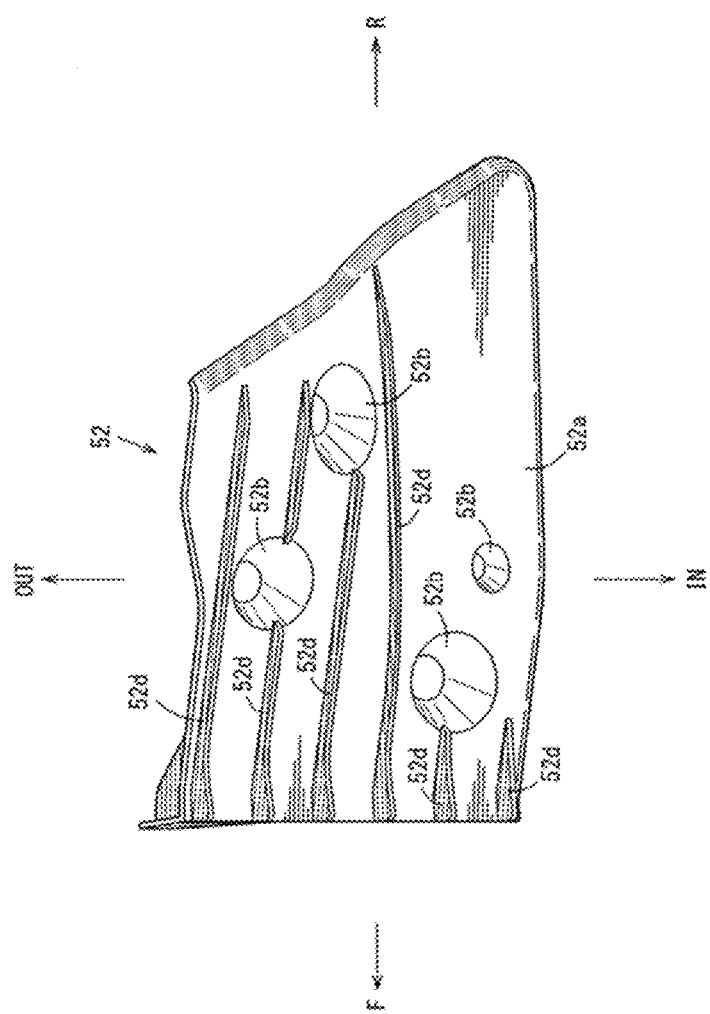
FIG. 6 is a bottom perspective view of the second undercover member according to some embodiments of the present disclosure.

The drawings illustrate a lower vehicle-body structure of a vehicle. FIG. 1 is a bottom view of the lower vehicle-body structure of the vehicle according to some embodiments of the present disclosure. FIG. 2 is a side view of the vehicle left side illustrating the lower vehicle-body structure of the vehicle according to some embodiments of the present disclosure. FIG. 3 is a rear view of the lower vehicle-body structure of the vehicle according to some embodiments of the present disclosure. FIG. 4 is a perspective view illustrating a rear suspension apparatus according to some embodiments of the present disclosure. FIG. 5 is a main-part perspective view illustrating a mounting structure of each of first and second undercover members according to some embodiments of the present disclosure. FIG. 6 is a bottom perspective view of a second undercover member according to some embodiments of the present disclosure.

In FIG. 2, a kick-up portion that rises upward from a rear end of a front floor panel is provided, and a rear floor panel 1 that extends rearward from the kick-up portion is provided in the kick-up portion. The rear floor panel 1 forms floor surfaces of a vehicle cabin and a trunk, and a rear seat pan 2 is integrally formed on the rear floor panel 1.

From a rear end portion of the rear floor panel 1 to a rear end portion of the front floor panel, rear side frames 3 each having a front-rear two-part split structure that extend in the front-rear direction of the vehicle are provided on both of left and right vehicle-width-direction end portions of those floor panels.

Side sills (not shown) that extend to the vehicle front side to be continuous from the rear side frames 3 are provided, and rear end portions of the side sills are provided so as to overlap with front end portions of the rear side frames 3. The rear side frames 3 and the side sills described above are all vehicle-body strength members.

Meanwhile, as illustrated in FIG. 1 to FIG. 3, a rear bumper 4 is installed on a rear portion of the vehicle so as to mitigate shock at the time of collision from the rear side.

The rear bumper 4 is an injection molded article of resin installed along a lower end portion of the rear portion of the vehicle. The rear bumper 4 covers a vehicle-body rear structure formed by a rear bumper reinforcement, a rear portion of the rear floor panel 1, a rear portion of the rear side frame 3, a rear end panel, and the like, and a silencer 10 described below from the rear side.

As illustrated in FIG. 1 to FIG. 3, the rear bumper 4 has a main wall portion 4A that covers an intermediate portion of the vehicle-body rear structure in the vehicle width direction, and side wall portions 4B that cover left and right corner portions in the vehicle-body rear structure by wrapping therearound to the vehicle front side from vehicle-width-direction end portions of the main wall portion 4A.

As illustrated in FIG. 3, the main wall portion 4A of the rear bumper 4 is configured by an upper wall portion 5, an intermediate wall portion 6, and a lower wall portion 7. The upper wall portion 5 has an upper end portion mounted along an upper end portion of a rear end panel. The intermediate wall portion 6 extends in the up-down direction and the vehicle width direction to be continuous from a lower portion of the upper wall portion 5. The lower wall portion 7 extends in the up-down direction and the vehicle width direction to be continuous from a lower portion of the intermediate wall portion 6. A lower piece portion 7a positioned on a lower end of the lower wall portion 7 is positioned on the rear side of the rear end panel in the front-rear direction and is positioned on the lower side of the rear floor panel 1 in the up-down direction.

The rear bumper 4 has lower corner walls 4C continuous with vehicle-width-direction outer portions of the lower wall portion 7 and lower portions of the side wall portions 4B, and openings 8 from which exhaust gas exhausted from tail pipes 12, 13 described below is discharged to the vehicle rear side are formed in rear surface portions of those lower corner walls 4C.

The vehicle of the present embodiment is a front-engine rear-drive (front-engine rear-wheel drive) type, that is, a so-called FR-type. Therefore, in the vehicle-width-direction center of the front floor panel, a tunnel portion 9 that extends in the front-rear direction of the vehicle and protrudes to the vehicle cabin side is provided (see FIG. 1).

As illustrated in FIG. 1, on the lower front side of the rear bumper 4, the silencer 10 serving as a silencing apparatus transversely disposed so as to extend in the vehicle width direction is provided.

As illustrated in the same drawing, in the vehicle-width-direction center of a front portion of the silencer 10, the silencer 10 has an inlet pipe 11 that introduces exhaust gas into the silencer 10. On both of left and right end portions of the silencer 10 in the vehicle width direction, the tail pipes 12, 13 each having an L-shape in bottom view are provided. Rear end portions 12a, 13a of the tail pipes 12, 13 face the openings 8 in the rear bumper 4. As illustrated in FIG. 1 to FIG. 3, a lower surface 10a of the silencer 10 is formed in a substantially flat shape.

On lower portions of the pair of left and right rear side frames 3, a rear suspension apparatus 20 that independently suspends left and right rear wheels (not shown) is provided (see FIG. 4). In the embodiment, a multi-link rear suspension is employed as the rear suspension apparatus 20.

As illustrated in FIG. 4, the rear suspension apparatus 20 includes a suspension cross member 24 (so-called subframe) in which a front cross member 21, a rear cross member 22, and a pair of left and right side cross members 23, 23 are combined in a well crib form in vehicle plan view.

The front cross member 21 connects front sides of the pair of left and right side cross members 23, 23 to each other in the vehicle width direction. The rear cross member 22 connects rear sides of the pair of left and right side cross members 23, 23 to each other in the vehicle width direction.

The side cross members 23 extend in the vehicle front-rear direction. Parts in the side cross members 23 on the front side of sections connected to the front cross member 21 extend to the vehicle front side and the vehicle-width-direction outer side. Vehicle-body mounting members 25 are provided on front end portions of the side cross members 23.

Parts in the side cross members 23 on the rear side of sections connected to the rear cross member 22 extend to the vehicle rear side and the vehicle-width-direction outer side. Vehicle-body mounting members 26 are provided on rear end portions of the side cross members 23.

The multi-link rear suspension includes five suspension links 27, 28, 29, 30, 31 on each of the left and right sides. Those five suspension links 27, 28, 29, 30, 31 have three lower links 27, 28, 29 positioned on the lower side and two upper links 30, 31 positioned on the upper side, and the suspension cross member 24 and wheel support members (not shown) of the rear wheels are connected to each other by the five suspension links 27 to 31 on each side.

The three lower links positioned on the lower side include a lower lateral link 27, a toe control link 28 positioned on the rear side of the lower lateral link 27, and a lower trailing link 29 positioned on the front side of the lower lateral link 27.

The two upper links positioned on the upper side include an upper lateral link 30, and an upper trailing link 31 positioned on the front side of the upper lateral link 30.

The lower lateral link 27 extends from a mounting portion 32 toward the vehicle-body outer side in the vehicle width direction, and an end portion 27a on the rear wheel side is connected to the wheel support member.

The toe control link 28 extends from a mounting portion toward the vehicle-body outer side to be tilted forward, and an end portion 28a on the rear wheel side is connected to the wheel support member.

The lower trailing link 29 extends from a mounting portion toward the vehicle-body outer side to be tilted rearward, and an end portion 29a on the rear wheel side is connected to the wheel support member.

The upper lateral link 30 extends from a mounting portion 33 toward the vehicle-body outer side to be tilted forward, and an end portion 30a on the rear wheel side is connected to the wheel support member.

The upper trailing link 31 extends from a mounting portion 34 toward the vehicle-body outer side to be tilted rearward, and an end portion 31a on the rear wheel side is connected to the wheel support member.

As illustrated in FIG. 2, the suspension cross member 24 is fixed to a lower portion of the rear side frame 3 via the front and rear vehicle-body mounting members 25, 26. A mounting seat 35 is provided on a lower portion of the rear side frame 3 facing the vehicle-body mounting member 25 on the front end portion in the up-down direction, and the vehicle-body mounting member 25 on the front end portion of the suspension cross member 24 is fixed to the mounting seat 35.

The rear suspension apparatus 20 includes a suspension damper 36.

The suspension damper 36 includes a strut 37, and a coil spring provided between an upper seat and a lower seat in a tensioned state. An upper end portion of the suspension damper 36 is attached to the rear side frame 3, and a lower end portion of the suspension damper 36 is attached to the lower lateral link 27.

In other words, the multi-link rear suspension apparatus 20 has a total of five sets of suspension links (a total of five sets, that is, the lower lateral links 27, the toe control links 28, the lower trailing links 29, the upper lateral links 30, and the upper trailing links 31), and each of those suspension links 27 to 31 are provided so as to extend from a lower position of a wheel well to the vehicle-width-direction inner side.

As illustrated in FIG. 4, a stabilizer 40 is held on rear portions of the side cross members 23 with use of brackets 38 and holding tools 39.

The stabilizer 40 suppresses the roll angle (for example, the vehicle body is tilted when the vehicle turns a corner, and the tilt angle is referred to as a roll angle) at the time of bump or rebound of only one wheel by resistance of torsional rigidity.

On lower portions of the vehicle-body mounting members 25 on the front end portions, brackets 41 that extend from the lower portions toward the vehicle-outer-direction front sides are provided.

Out of the abovementioned suspension links (the lower lateral links 27, the toe control links 28, the lower trailing links 29, the upper lateral links 30, and the upper trailing links 31), the lower lateral links 27 serving as one set of a pair of left and right first suspension links are each configured in a U-shape in cross-section of which upper surface is opened as illustrated in FIG. 5.

In other words, as illustrated in FIG. 5, the lower lateral link 27 is configured by connecting a front wall 27b, a bottom wall 27c (see FIG. 2), and a rear wall 27d to each other in a U-shape in cross-section, and includes a flange portion 27e that extends to the vehicle front side from an upper end of the front wall 27b, and a flange portion 27f that extends to the vehicle rear side from an upper end of the rear wall 27d.

As illustrated in FIG. 5, the front and rear flange portions 27e, 27f in the upper surface of the lower lateral link 27 fix an upper wall member 27h having a long hole 27g through which the strut 37 of the suspension damper 36 is inserted by welding. By the upper wall member 27h, the rigidity of the lower lateral link 27 is improved while the up-down displacement of the lower lateral link 27 is tolerated.

As illustrated in FIG. 1, FIG. 2, and FIG. 5, on a rear side portion of the lower lateral link 27, a first undercover member 51 that covers a vehicle-body lower surface so as to be flush with a lower surface of the lower lateral link 27, in other words, a lower surface of the bottom wall 27c is provided.

As a result, the deterioration of the aerodynamic characteristics is suppressed since the first undercover member 51 saves the space as a result of effectively utilizing the lower surface of the lower lateral link 27 by the first undercover member 51 being flush with the lower surface of the lower lateral link 27. In other words, by using the lower surface of the lower lateral link 27 as a part of the undercover portion, the area of the first undercover member 51 is reduced by the amount, thereby reducing space. In addition, a case where underfloor traveling air becomes entrained by the rear suspension apparatus 20 and peripheral parts thereof at the first undercover member 51 is suppressed.

As illustrated in FIG. 5, the first undercover member 51 includes a bottom wall 51a, a plurality of truncated-cone-shaped mounting seats 51b formed to be raised upward from the bottom wall 51a, and a plurality of ribs 51c that radially extend and connect outer peripheral portions of the mounting seats 51b and the bottom wall 51a to each other.

Meanwhile, a plurality of mounting pieces 42 are integrally provided on the rear wall 27d of the lower lateral link 27. The first undercover member 51 is mounted on the lower lateral link 27 by connecting and fixing the mounting seat 51b of the first undercover member 51 to the mounting pieces 42 of the lower lateral link 27 with use of mounting members 43 such as bolts and nuts.

As illustrated in FIG. 1 and FIG. 5, out of the abovementioned suspension links (the lower lateral link 27, the toe control link 28, the lower trailing link 29, the upper lateral link 30, and the upper trailing link 31), a second undercover member 52 that covers a vehicle-body lower surface so as to be flush with the lower surface of the lower lateral link 27 is provided on each of the lower trailing links 29 serving as another set of a pair of left and right second suspension links positioned on the vehicle front side of the lower lateral link 27.

As a result, the deterioration of the aerodynamic characteristics is further suppressed by the second undercover member 52 and the first undercover member 51 positioned on the front side and the rear side.

As illustrated in FIG. 5, the second undercover member 52 includes a bottom wall 52a, a plurality of truncated-cone-shaped mounting seats 52b formed to be raised upward from the bottom wall 52a, and a plurality of ribs 52c that radially extend and connect outer peripheral portions of the mounting seats 52b and the bottom wall 52a to each other.

Meanwhile, the lower trailing link 29 is formed in an inverted U-shape in cross-section. A plurality of mounting pieces 44 that extend from lower ends of a front wall and a rear wall of the lower trailing link 29 in the vehicle front-rear direction are integrally formed. The second undercover member 52 is mounted on the lower trailing link 29 by connecting and fixing the mounting seat 52b of the second undercover member 52 to the mounting pieces 44 of the lower trailing link 29 with use of mounting members 45 such as bolts and nuts.

FIG. 6 is a lower perspective view of the second undercover member 52 according to some embodiments of the present disclosure. As illustrated in the same drawing, on a lower surface of the second undercover member 52, a plurality of ribs 52d that extend in the front-rear direction of the vehicle so as to protrude to the vehicle lower side are provided in parallel to each other.

As a result, a case where underfloor traveling air that flows toward the vehicle rear side from the vehicle front side through a lower portion of the second undercover member 52 is released to the left and right in the vehicle width direction is suppressed by the plurality of ribs 52d, thereby improving the rectification effect. In addition, the rigidity of the second undercover member 52 is improved by the ribs 52d.

As illustrated in FIG. 1, third undercover members 53 that cover the vehicle-body lower surface are provided on the vehicle-width-direction inner sides of the second undercover members 52, the vehicle-width-direction inner sides of proximal-end-side vehicle front portions of the lower lateral links 27, and the vehicle-width-direction inner sides of the mounting portions 32 of the lower lateral link 27.

As a result, the rectification effect of the underfloor traveling air is further improved together with each of the first and second undercover members 51, 52 serving as other undercover members.

As illustrated in FIG. 4, the third undercover members 53 are supported by the suspension cross member 24 via stays 46 positioned in lower front portions of the side cross members 23, and support brackets 47 positioned on the lower side close to the vehicle-width-direction end portions of the front cross member 21 in the suspension cross member 24.

Incidentally, as illustrated in FIG. 3 and FIG. 5, the lower surface of the lower lateral link 27 serving as the first suspension link includes, on the free end side thereof, a curvature shape portion 48 that protrudes to lower side, and a curvature shape portion 49 that protrudes upward from the curvature shape portion 48 to a longitudinal-direction intermediate portion of the lower lateral link 27.

On the bottom wall 51a of the first undercover member 51, curvature portions 54, 55 are provided along the curvature shape portions 48, 49 of the lower lateral link 27. As a result, the curvature portions 54, 55 of the first undercover member 51 extend along the curvature shapes of the lower surface of the lower lateral link 27 serving as the first suspension link, and the rectification function of the underfloor traveling air is ensured.

As illustrated in FIG. 1, on a lower left portion of the vehicle, a fourth undercover member 56 that covers the vehicle-body lower surface from a lower end portion of the tunnel portion 9 on the vehicle-width-direction left side thereof to a lower portion of a side-sill outer portion is provided on the front side of each of the second and third undercover members 52, 53.

Similarly, as illustrated in FIG. 1, on a lower right portion of the vehicle, a fifth undercover member 57 that covers the vehicle-body lower surface from a lower end portion of the tunnel portion 9 on the vehicle-width-direction right side thereof to a lower portion of a side-sill outer portion is provided on the front side of each of the second and third undercover members 52, 53. Each of those fourth and fifth undercover members 56, 57 is mounted on and supported by the body.

Figure 7:
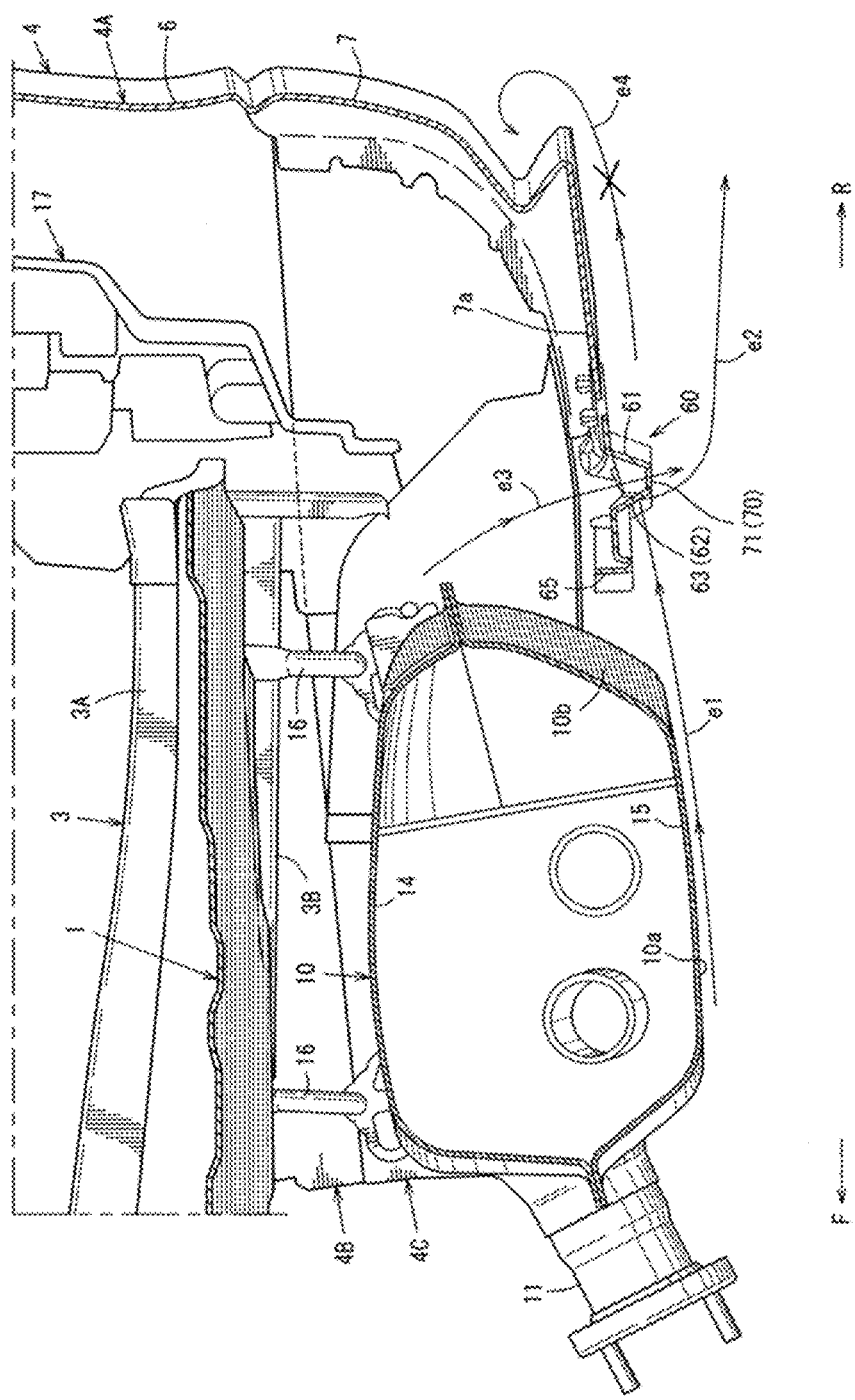
FIG. 7 is a cross-sectional view of FIG. 1 seen from arrows A-A according to some embodiments of the present disclosure.
Figure 8:
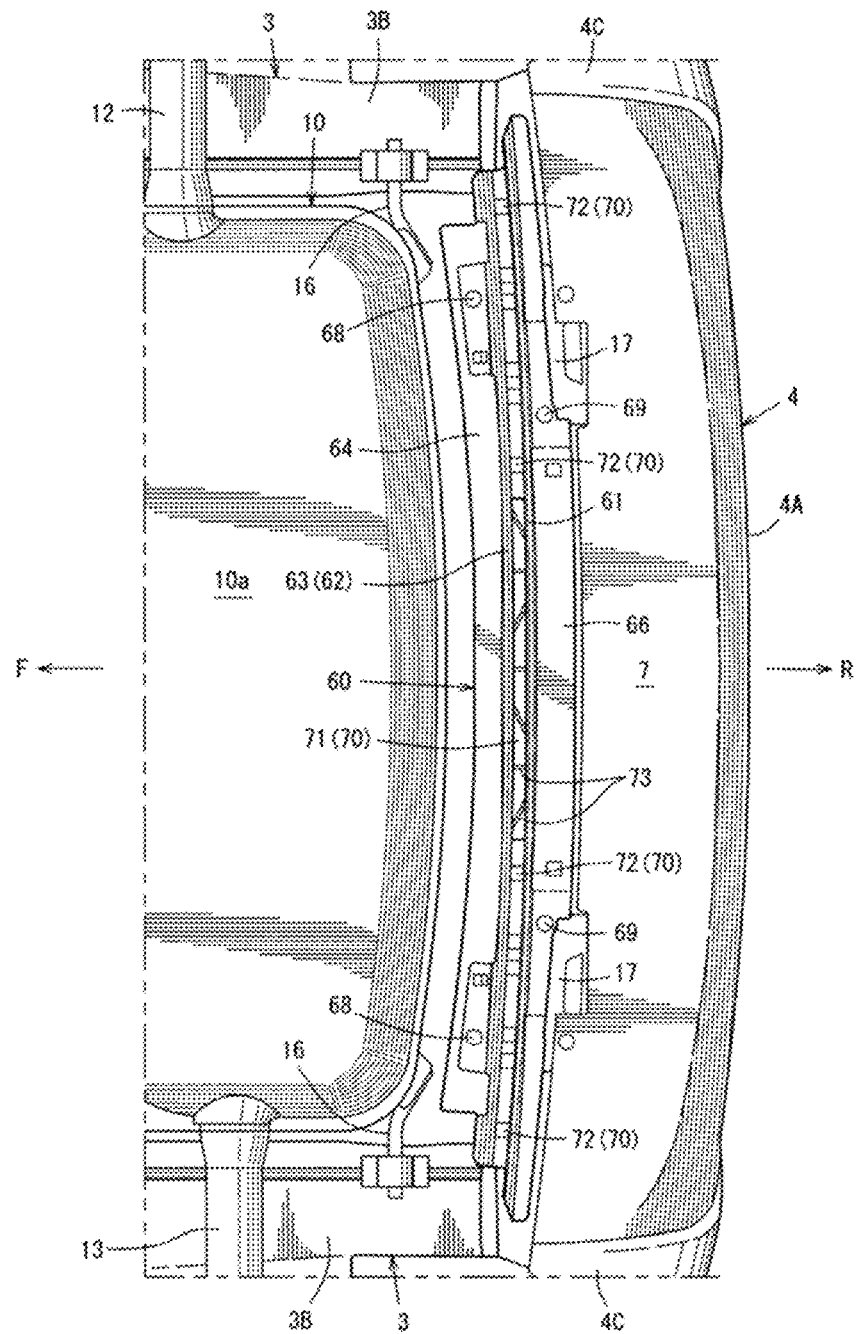
FIG. 8 is a main-part bottom view of FIG. 7 according to some embodiments of the present disclosure.
Figure 9:
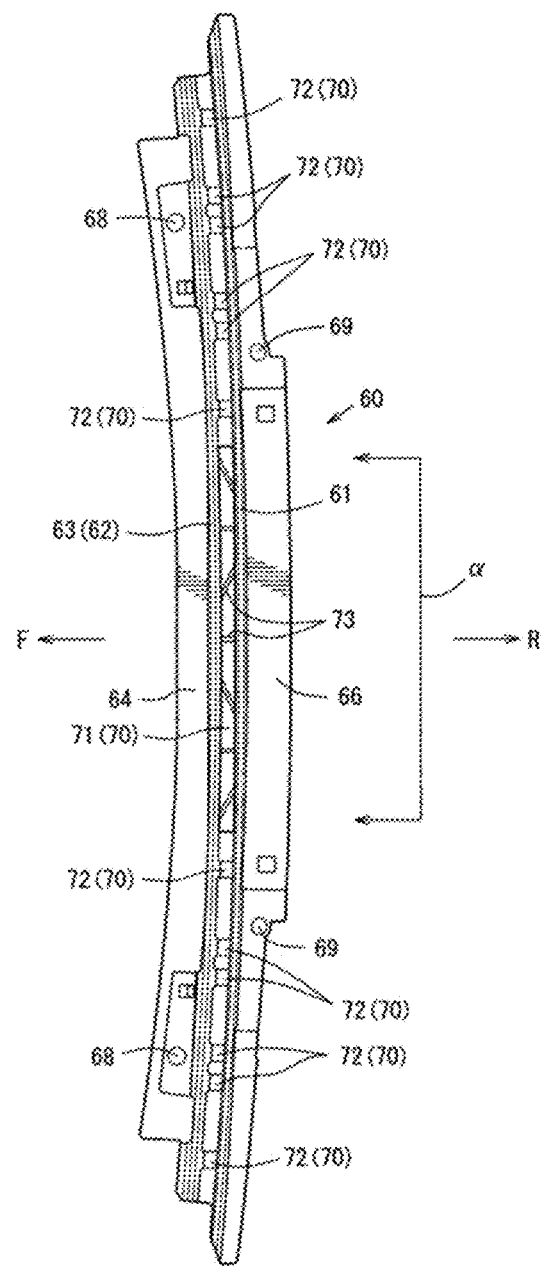
FIG. 9 is a bottom view of a shielding member according to some embodiments of the present disclosure.
Figure 10:
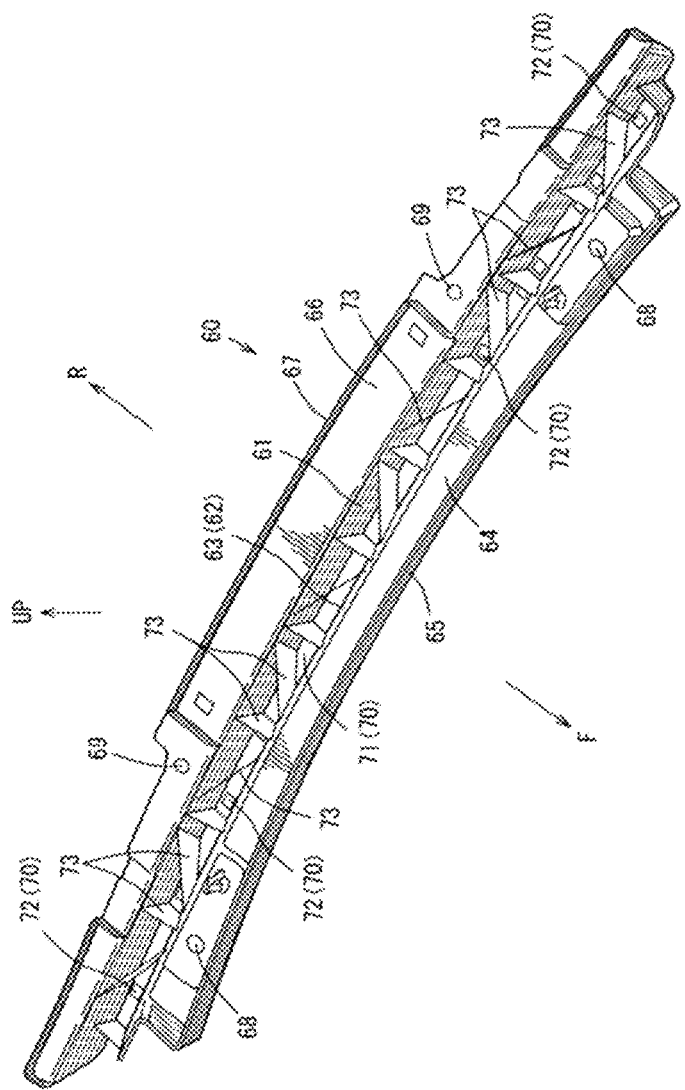
FIG. 10 is an upper perspective view of the shielding member according to some embodiments of the present disclosure.

FIG. 7 is a cross-sectional view of FIG. 1 seen from arrows A-A according to some embodiments of the present disclosure. FIG. 8 is a main-part bottom view of FIG. 7 according to some embodiments of the present disclosure. FIG. 9 is a bottom view of a shielding member according to some embodiments of the present disclosure. FIG. 10 is an upper perspective view of the shielding member according to some embodiments of the present disclosure. FIG. 11 is a cross-sectional view of a vehicle-width-direction central portion of the shielding member according to some embodiments of the present disclosure.

As illustrated in FIG. 7, the rear side frame 3 includes a rear-side-frame upper portion 3A positioned on an upper portion of the rear floor panel 1, and a rear-side-frame lower portion 3B positioned on a lower portion of the rear floor panel 1.

As illustrated in FIG. 7, the silencer 10 is configured by joining a lower flange of the silencer upper case 14 and an upper flange of a silencer lower case 15 to each other, and the silencer 10 is supported by the rear-side-frame lower portion 3B with use of a plurality of hanger members 16.

As illustrated in FIG. 7 and FIG. 8, a cover member 60 serving as the shielding member is provided between the lower piece portion 7a that extends in the vehicle front-rear direction on the lower wall portion 7 of the rear bumper 4 and a rear portion of the silencer 10.

As illustrated in FIG. 7 and FIG. 8, the cover member 60 is provided so as to extend in the vehicle width direction to at least overlap with a rear vertical wall 10b of the silencer 10 in the up-down direction in vehicle rear view.

In other words, as illustrated in FIG. 7, the cover member 60 includes a cover surface 61 serving as a shielding surface that overlaps with the rear vertical wall 10b of the silencer 10 in the up-down direction in vehicle rear view.

As illustrated in FIG. 8, the cover surface 61 extends in the vehicle width direction across a place between vehicle-width-direction intermediate portions of the pair of left and right rear-side-frame lower portions 3B.

As illustrated in FIG. 7 and FIG. 8, the cover member 60 includes a guide portion 62 that guides underfloor traveling air e1, which flows to the vehicle rear side from the vehicle front side through the lower portion of the silencer 10, downward. In other words, the cover member 60 includes a guide surface 63 that is positioned on the front side of the cover surface 61 serving as the shielding surface and guides the underfloor traveling air e1, which flows to the vehicle rear side from the vehicle front side through the lower portion of the silencer 10, downward.

As illustrated in FIG. 8, the guide surface 63 extends in the vehicle width direction across a place between vertical wall portions in the pair of left and right rear-side-frame lower portions 3B on the vehicle-width-direction inner sides thereof.

As above, the cover member 60 positioned between the rear bumper 4 and the silencer 10 extend in the vehicle width direction by overlapping with at least the rear vertical wall 10b of the silencer 10 in the up-down direction in vehicle rear view, and the guide portion 62 that guides the underfloor traveling air e1, which flows to the rear side through the lower portion of the silencer 10, downward is provided on the cover member 60.

As a result, the appearance is improved by suppressing a case where the silencer 10 is visible from the vehicle rear side, and the aerodynamic characteristics are improved by suppressing the entrainment of the underfloor traveling air e1 (see entrainment air e4 illustrated by an arrow in FIG. 7) on the rear side of the rear bumper 4.

In detail, the cover member 60 overlaps with at least the rear vertical wall 10b of the silencer 10 in the up-down direction in vehicle rear view. Therefore, the appearance is improved by suppressing a case where the silencer 10 is visible from the vehicle rear side.

On the cover member 60, the guide portion 62 that guides the underfloor traveling air e1, which flows to the rear side through the lower portion of the silencer 10, downward is provided. Therefore, the aerodynamic characteristics are improved by deflecting the underfloor traveling air e1 to the lower side so as to suppress the entrainment of the underfloor traveling air e1 (see the entrainment air e4) on the rear side of the rear bumper 4.

As illustrated in FIG. 9, FIG. 10, and FIG. 11, in some embodiments, the cover member 60 has a front flange portion 64 that extends to the vehicle front side from an upper end of the guide portion 62, and a rising wall 65 raised upward from a front end of the front flange portion 64.

As illustrated in the same drawings, the cover member 60 has a rear flange portion 66 that extends to the vehicle rear side from an upper end of the cover surface 61, and a rising wall 67 raised upward from a rear end of the rear flange portion 66.

A pair of left and right mounting portions 68 of the front flange portion 64 illustrated in FIG. 9 are mounted on lower portions of retainers 17 (see FIG. 8) with use of mounting members, and a pair of left and right mounting portions 69 of the rear flange portion 66 are mounted on the lower portions of the retainers 17 (see FIG. 8) with use of the mounting members.

As illustrated in FIG. 11, in some embodiments, in a lower rear portion of the guide portion 62, blow-out holes 70 are provided which guide traveling air (see blow-out air e3 indicated by an arrow in FIG. 7), which flows to rear side through an upper portion of the silencer 10, downward and from which the traveling air is blown out.

As illustrated in FIG. 9 to FIG. 11, in some embodiments, the blow-out holes 70 are formed between the cover surface 61 and the guide surface 63.

The blow-out holes 70 include a slit-shaped blow-out hole 71 (so-called slit-shaped opening) that is positioned in a vehicle-width-direction central portion and is continuous across a predetermined range α (see FIG. 9) in the vehicle width direction, and a plurality of independent blow-out holes 72 (so-called quadrilateral holes) of which opening areas are small and which are positioned on the left side and right side on the outer sides of the blow-out hole 71 in the vehicle width direction and spaced apart from each other in the vehicle width direction.

In the present embodiment, the predetermined range α is set to a vehicle-width-direction length that is about 30% of the distance by which vehicle-width-direction central portions of the left and right rear-side-frame lower portions 3B are spaced apart from each other, but the formation length of the slit-shaped blow-out hole 71 in the vehicle width direction is not limited to the above. The blow-out holes 72 are formed as quadrilateral holes but may be round holes.

After the underfloor traveling air e1 that flows to the rear side through the lower portion of the silencer 10 hits the guide portion 62, the underfloor traveling air e1 is separated so as to be guided downward by the guide portion 62 and further flows to the rear side as separation air e2. By providing the blow-out holes 70, the traveling air (blow-out air e3) blown out from the blow-out holes 70 further pushes the separation air e2 down to the lower side. As a result, the entrainment of the underfloor traveling air (entrainment air e4) on the rear side of the rear bumper 4 can be suppressed even more, thereby further improving the aerodynamic characteristics.

As illustrated in FIG. 8 and FIG. 9, by forming the blow-out hole 70 to have a slit shape long in the vehicle width direction in the vehicle-width-direction central portion of the cover member 60, a function of pushing the underfloor traveling air (see the separation air e2 illustrated in FIG. 7 here) at the vehicle-width-direction central portion down to the lower side by the air (in other words, the blow-out air e3) blown out from the blow-out hole 70 having a slit shape long in the vehicle width direction can be sufficiently ensured. As a result, the entrainment of the underfloor traveling air on the rear side of the rear bumper 4 is suppressed in an even more reliable manner.

As illustrated in FIG. 7 and FIG. 11, the guide surface 63 and the cover surface 61 are provided to be offset from each other in the vehicle front-rear direction.

A shielding function required for the cover surface 61 serving as the shielding surface and a guiding function required for the guide surface 63 are fundamentally different from each other, but the functions in accordance with the respective requirements are ensured by providing the guide surface 63 and the cover surface 61 to be offset from each other in the vehicle front-rear direction.

As illustrated in FIG. 11, the cover surface 61 is formed in an inclined form in which the cover surface 61 is positioned closer to the vehicle front side as the cover surface 61 approaches the lower side. Meanwhile, the guide surface 63 is formed in an inclined form in which the guide surface 63 is positioned closer to the vehicle rear side as the guide surface 63 approaches the lower side. In the present embodiment, as illustrated in the same drawing, the cover surface 61 is formed in an inclined form in which the cover surface 61 is positioned closer to the vehicle front side as the cover surface 61 approaches the lower side by an inclination angle θ1 with respect to a virtual perpendicular line (VER), and the inclination angle θ1 is set to about 15 degrees.

The guide surface 63 is formed in an inclined form in which the guide surface 63 is positioned closer to the vehicle rear side as the guide surface 63 approaches the lower side by an inclination angle θ2 with respect to the virtual perpendicular line (VER), and the inclination angle θ2 is set in a range of from 15 degrees to 30 degrees. The inclination angles θ1, θ2 are not limited to those numerical values.

As a result, the cover surface 61 and the guide surface 63 in inclined forms in accordance with the respective requirements for the cover surface 61 and the guide surface 63 are formed.

As illustrated in FIG. 10, a plurality of ribs 73 that connect the guide surface 63 and the cover surface 61 to each other in the vehicle front-rear direction are formed across the entire region in the vehicle width direction between the guide surface 63 and the cover surface 61 in which the guide surface 63 and the cover surface 61 are provided to be offset from each other in the vehicle front-rear direction. The ribs 73 are each formed to have a thin plate thickness so as not to inhibit the flow of the blow-out air e3. By each of those ribs 73, the rigidity of the formation regions of the blow-out holes 70 is ensured.

The cover member 60 (shielding member) including the cover surface 61, the guide portion 62, the guide surface 63, the flange portions 64, 66, the rising walls 65, 67, the mounting portions 68, 69, the blow-out holes 70, and the ribs 73 can be integrally formed by a synthetic resin.

In the drawings, an arrow F indicates the vehicle front side, an arrow R indicates the vehicle rear side, an arrow IN indicates the inner side in the vehicle width direction, an arrow OUT indicates the outer side in the vehicle width direction, and an arrow UP indicates the vehicle upper side.

As above, the lower vehicle-body structure of the vehicle according to the present embodiment is a lower vehicle-body structure including the silencer 10 transversely disposed on the lower front side of the rear bumper 4 so as to extend in the vehicle width direction, characterized in that: the shielding member (see the cover member 60) is provided between the rear bumper 4 and the silencer 10; the shielding member (cover member 60) is provided so as to extend in the vehicle width direction to overlap with at least the rear vertical wall 10b of the silencer 10 in the up-down direction in vehicle rear view; and the shielding member (cover member 60) is provided with the guide portion 62 that guides the underfloor traveling air e1 downward, the underfloor traveling air e1 flowing to the rear side through the lower portion of the silencer 10 (see FIG. 7).

According to the lower vehicle-body structure of the vehicle as above, the appearance can be improved by suppressing a case where the silencer 10 is visible from the vehicle rear side and the aerodynamic characteristics can be improved by suppressing the entrainment of the underfloor traveling air on the rear side of the rear bumper 4.

In detail, the shielding member (cover member 60) overlaps with at least the rear vertical wall 10b of the silencer 10 in the up-down direction in vehicle rear view. Therefore, the appearance can be improved by suppressing a case where the silencer 10 is visible from the vehicle rear side.

On the shielding member (cover member 60), the guide portion 62 that guides the underfloor traveling air e1, which flows to the rear side through the lower portion of the silencer 10, downward is provided. Therefore, the aerodynamic characteristics can be improved by deflecting the underfloor traveling air (specifically, the separation air e2) to the lower side so as to suppress the entrainment (see the entrainment air e4) of the underfloor traveling air on the rear side of the rear bumper 4.

In the lower vehicle-body structure of the vehicle, the blow-out holes 70 which guide the traveling air (blow-out air e3), which flows to the rear side through the upper portion of the silencer 10, downward and from which the traveling air is blown out are provided in the guide portion 62 (see FIG. 7 and FIG. 11).

According to the lower vehicle-body structure of the vehicle as above, the underfloor traveling air (separation air e2) is pushed down to the lower side by the traveling air (blown-out air e3) blown out downward from the abovementioned blow-out holes 70. Therefore, the aerodynamic characteristics can be further improved by suppressing the entrainment of the underfloor traveling air (entrainment air e4) on the rear side of the rear bumper 4 even more.

In the lower vehicle-body structure of the vehicle, the abovementioned shielding member (cover member 60) includes: the shielding surface (cover surface 61) that overlaps with at least the rear vertical wall 10b of the silencer 10 in the up-down direction in vehicle rear view; and the guide surface 63 that is positioned on the front side of the shielding surface (cover surface 61) and guides the underfloor traveling air e1 downward, the underfloor traveling air e1 flowing to the rear side through the lower portion of the silencer 10, and the guide surface 63 and the shielding surface (cover surface 61) are provided to be offset from each other in the vehicle front-rear direction (FIG. 7).

According to the lower vehicle-body structure of the vehicle as above, effects as follows are obtained.

Specifically, a shielding function required for the shielding surface (cover surface 61) and a guiding function required for the guide surface 63 are fundamentally different from each other, but the functions in accordance with the respective requirements can be ensured by providing the guide surface 63 and the shielding surface (cover surface 61) to be offset from each other in the vehicle front-rear direction.

In the lower vehicle-body structure of the vehicle, the shielding surface (cover surface 61) is formed in an inclined form in which the shielding surface (cover surface 61) is positioned closer to the vehicle front side as the shielding surface (cover surface 61) approaches the lower side, and the guide surface 63 is formed in an inclined form in which the guide surface 63 is positioned closer to the vehicle rear side as the guide surface 63 approaches the lower side (see FIG. 11).

According to the lower vehicle-body structure of the vehicle, the shielding surface (cover surface 61) and the guide surface 63 in inclined forms in accordance with the respective requirements for the abovementioned shielding surface (cover surface 61) and guide surface 63 can be formed.

In the lower vehicle-body structure of the vehicle, the blow-out holes 70 are formed between the abovementioned shielding surface (cover surface 61) and the guide surface 63 (see FIG. 11).

According to the lower vehicle-body structure of the vehicle as above, the aerodynamic characteristics can be improved by pushing the underfloor traveling air (separation air e2) down to the lower side by the air (blow-out air e3) blown out from the abovementioned blow-out holes 70 formed between the abovementioned shielding surface (cover surface 61) and the guide surface 63, and suppressing the entrainment of the underfloor traveling air (entrainment air e4) on the rear side of the rear bumper 4.

In the lower vehicle-body structure of the vehicle, the blow-out hole 70 may be formed in a slit shape (see the blow-out hole 71) long in the vehicle width direction in the vehicle-width-direction central portion of the abovementioned shielding member (cover member 60) (see FIG. 9).

According to the lower vehicle-body structure of the vehicle as above, a function of pushing the underfloor traveling air (separation air e2) at the vehicle-width-direction central portion down to the lower side by the air (blow-out air e3) blown out from the blow-out hole 71 having a slit shape long in the vehicle width direction can be sufficiently ensured, and the entrainment (entrainment air e4) of the underfloor traveling air on the rear side of the rear bumper 4 can be suppressed in an even more reliable manner.

Regarding the correspondence between the configuration of the present disclosure and the abovementioned embodiment, the shielding member of the present disclosure corresponds to the cover member 60 of the embodiment. Similarly, the shielding surface corresponds to the cover surface 61. However, the present disclosure is not limited to the configuration of the abovementioned embodiment.

INDUSTRIAL APPLICABILITY

As described above, the present disclosure is useful as a lower vehicle-body structure of a vehicle including a silencer transversely disposed on the lower front portion of a rear bumper so as to extend in the vehicle width direction.

REFERENCE SIGNS LIST

4 Rear bumper
10 Silencer
10b Rear vertical wall
60 Cover member (shielding member)
61 Cover surface (shielding surface)
62 Guide portion
63 Guide surface
70 Blow-out hole

The invention claimed is:
1. A lower vehicle-body structure of a vehicle, the lower vehicle-body structure comprising a silencer transversely disposed on a lower front side of a rear bumper so as to extend in a vehicle width direction, wherein:
 a shield is provided between the rear bumper and the silencer;

the shield is provided so as to extend in the vehicle width direction to overlap with at least a rear vertical wall of the silencer in an up-down direction in vehicle rear view; and the shield is provided with a guider that guides underfloor traveling air downward, the underfloor traveling air flowing to a rear side through a lower portion of the silencer, wherein the guider is provided with a blow-out hole which guides traveling air downward and from which the traveling air is blown out, the traveling air flowing to the rear side through an upper portion of the silencer, wherein the shield includes:
 a shielding surface that overlaps with at least the rear vertical wall of the silencer in the up-down direction in vehicle rear view; and
 a guide surface that is positioned on a front side of the shielding surface and guides the underfloor traveling air downward, the underfloor traveling air flowing to the rear side through the lower portion of the silencer, and
 the guide surface and the shielding surface are provided to be offset from each other in a vehicle front-rear direction, wherein the shielding surface is formed in an inclined form in which the shielding surface is positioned closer to a vehicle front side as the shielding surface approaches a lower side, and the guide surface is formed in an inclined form in which the guide surface is positioned closer to a vehicle rear side as the guide surface approaches the lower side, wherein the blow-out hole is formed between the shielding surface and the guide surface, and wherein the blow-out hole is formed in a slit shape long in the vehicle width direction in a vehicle-width-direction central portion of the shield.

2. The lower vehicle-body structure of the vehicle according to claim 1, wherein the shield is provided on a front side of a lower piece portion that extends in a vehicle front-rear direction on a lower wall portion of the rear bumper.

3. The lower vehicle-body structure of the vehicle according to claim 1, wherein a relationship between an inclination angle θ1 of the shielding surface with respect to a virtual vertical line and an inclination angle θ2 of the guide surface with respect to the virtual vertical line is θ1≤θ2.

4. The lower vehicle-body structure of the vehicle according to claim 2, wherein a relationship between an inclination angle θ1 of the shielding surface with respect to a virtual vertical line and an inclination angle θ2 of the guide surface with respect to the virtual vertical line is θ1≤θ2.

5. The lower vehicle-body structure of the vehicle according to claim 1, wherein the blowout hole is between a lower end of the shielding surface and a lower end of the guide surface, and is formed at a bottom of the shield.

6. The lower vehicle-body structure of the vehicle according to claim 2, wherein the blowout hole is between a lower end of the shielding surface and a lower end of the guide surface, and is formed at a bottom of the shield.

7. The lower vehicle-body structure of the vehicle according to claim 3, wherein the blowout hole is between a lower end of the shielding surface and a lower end of the guide surface, and is formed at a bottom of the shield.

8. The lower vehicle-body structure of the vehicle according to claim 4, wherein the blowout hole is between a lower end of the shielding surface and a lower end of the guide surface, and is formed at a bottom of the shield.

9. A lower vehicle-body structure of a vehicle, the lower vehicle-body structure comprising a silencer transversely disposed on a lower front side of a rear bumper so as to extend in a vehicle width direction, wherein:
 a shield is provided between the rear bumper and the silencer;
 the shield is provided so as to extend in the vehicle width direction to overlap with at least a rear vertical wall of the silencer in an up-down direction in vehicle rear view; and
 the shield is provided with a guider that guides underfloor traveling air downward, the underfloor traveling air flowing to a rear side through a lower portion of the silencer,
 wherein the shield includes:
  a shielding surface that overlaps with at least the rear vertical wall of the silencer in the up-down direction in vehicle rear view; and
  a guide surface that is positioned on a front side of the shielding surface and guides the underfloor traveling air downward, the underfloor traveling air flowing to the rear side through the lower portion of the silencer, and
 the guide surface and the shielding surface are provided to be offset from each other in a vehicle front-rear direction, and
 wherein the shielding surface is formed in an inclined form in which the shielding surface is positioned closer to a vehicle front side as the shielding surface approaches a lower side, and
 the guide surface is formed in an inclined form in which the guide surface is positioned closer to a vehicle rear side as the guide surface approaches the lower side, and
 wherein a plurality of ribs that connect the guide surface and the shielding surface to each other in the vehicle front-rear direction are formed across an entire region in a vehicle width direction between the guide surface and the shielding surface in which the guide surface and the shielding surface are provided to be offset from each other in the vehicle front-rear direction, each of the plurality of ribs having a plate shape.

10. The lower vehicle-body structure of the vehicle according to claim 9, wherein the shield is provided on a front side of a lower piece portion that extends in a vehicle front-rear direction on a lower wall portion of the rear bumper.

11. The lower vehicle-body structure of the vehicle according to claim 9, wherein a relationship between an inclination angle θ1 of the shielding surface with respect to a virtual vertical line and an inclination angle θ2 of the guide surface with respect to the virtual vertical line is θ1≤θ2.

12. The lower vehicle-body structure of the vehicle according to claim 10, wherein a relationship between an inclination angle θ1 of the shielding surface with respect to a virtual vertical line and an inclination angle θ2 of the guide surface with respect to the virtual vertical line is θ1≤θ2.

13. The lower vehicle-body structure of the vehicle according to claim 9, wherein a blowout hole is between a lower end of the shielding surface and a lower end of the guide surface, and is formed at a bottom of the shield.

14. The lower vehicle-body structure of the vehicle according to claim 10, wherein a blowout hole is between a lower end of the shielding surface and a lower end of the guide surface, and is formed at a bottom of the shield.

15. The lower vehicle-body structure of the vehicle according to claim 11, wherein the blowout hole is between a lower end of the shielding surface and a lower end of the guide surface, and is formed at a bottom of the shield.

16. The lower vehicle-body structure of the vehicle according to claim 12, wherein the blowout hole is between a lower end of the shielding surface and a lower end of the guide surface, and is formed at a bottom of the shield.

\* \* \* \* \*